Patented Apr. 1, 1952

2,591,436

UNITED STATES PATENT OFFICE 2,591,436

PROCESS FOR THE PRODUCTION OF ALUMINA VALUES

William Addison James, Arvida, Quebec, Canada, assignor to Aluminium Laboratories Limited, Montreal, Quebec, Canada, a corporation of Canada No Drawing. Application March 10, 1947, Serial No. 733,730. In Canada March 21, 1946

7 Claims. (Cl. 23—52)

This invention relates to the production of alumina from bauxite containing phosphorus.

The process most commonly resorted to for the production of alumina from bauxite is commonly known as the "Bayer" process, in which a more concentrated sodium aluminate solution is obtained by subjecting the bauxite to digestion with a less concentrated solution containing sodium hydroxide. In the ordinary operation of the process sodium carbonate is included in the liquor and calcium oxide or calcium hydroxide is added to the digester charge in order that losses of sodium hydroxide consumed in the course of the process of digestion may be replaced by reaction between them. With a good grade of bauxite, calcium hydroxide is consumed in a proportion of about 3 parts to 100 parts by weight of the bauxite treated, and 56 grams of calcium oxide may of course, if desired, be substituted for 74 grams of calcium hydroxide in the usual way. From experience, optimum quantitative relationships or proportions have become well known for the several constituents of the liquor at the various stages of digestion, alumina precipitation and recirculation, in order to obtain efficient production of high purity alumina under circumstances generally encountered.

It has been found that if the bauxite contains phosphorus this is dissolved therefrom during the process of digestion and that when the digest liquor is used repeatedly in the normal cyclic way for the digestion of fresh bauxite containing phosphorus, the concentration of phosphorus pentoxide in the sodium aluminate sometimes increases to an undesirable extent. For this no convenient remedy has heretofore been found. It may be explained that in alumina recovery operations of the ordinary sort, a serious disadvantage of such a high phosphorus content in the solution is that the product is correspondingly contaminated. That is to say, although during recycling the phosphorus concentration may build up to no more than some equilibrium value in the liquor, such equilibrium value appears to vary in a direct way with the phosphorus content of the bauxite, and the proportion of phosphorus in the precipitated alumina is in turn dependent on the equilibrium concentration, i. e. being greater when the equilibrium value is higher.

It has been known for some time in the art that the concentration of phosphorus in the liquor can be controlled by the addition of considerable quantities of calcium oxide or of calcium hydroxide to the digester charge. However, when the phosphorus pentoxide content of the bauxite becomes sufficiently large, the quantity of calcium hydroxide necessary to control the concentration of phosphorus pentoxide in the liquor becomes so large that the solubility of alumina is adversely affected with consequent avoidable losses, and the quantity of sodium hydroxide present, which it is important to control, becomes excessive.

I have discovered that the undue concentration of phosphorus pentoxide can be overcome in part by extending the time of digestion and in part by adding calcium carbonate to the digester charge so as to insure the presence therein of at least a given molar ratio between the calcium carbonate and the phosphorus pentoxide. That is to say, although calcium carbonate appears to be essentially insoluble in the solution, I have found that its incorporation, and consequent presence at the time of digestion, have the effect, in some way not yet fully understood, of depressing the solubility of phosphorus. At the same time even large amounts of the calcium carbonate do not seem to modify or disturb the proportions of sodium hydroxide and sodium carbonate in the liquor; the added material does not produce a causticization of sodium carbonate, and hence the optimum concentrations of total caustic and total alkali can be readily maintained in the solution. Tests have also revealed, as indicated above, that the time of digestion may be peculiarly significant in practical operation, for example in that useful economy of calcium carbonate can be achieved by extending the digestion time beyond the period which would ordinarily be deemed sufficient for a given set of conditions.

A further feature of my discovery is that the calcium hydroxide added for causticization represents another factor in determining the quantity of calcium carbonate necessary for optimum results in relation to a given phosphorus content of the bauxite. More specifically, the use of calcium hydroxide in the liquor has been found to permit a very considerable economy in the consumption of calcium carbonate for purposes of the invention. The precise extent of such economy depends on the amount of calcium hydroxide so used, which must vary as dictated by the composition of the solution when it returns from the precipitation stage. As explained above, however, calcium hydroxide by itself is either inadequate or undesirable for the control of substantial phosphorus concentrations; and to take advantage of my present discovery in avoiding the inadequacy or inefficiency of prior proposals, a significant quantity of calcium carbonate must be added.

With reference to commercial requirements of the usual sort, experience indicates that a certain phosphorus content in the produced alumina may be tolerated, and although special circumstances may require lower or permit higher values, my present understanding is that a concentration of 2 grams $P_2O_5$ per liter represents a significant maximum for the liquor, and thus indirectly represents a corresponding maximum tolerable phosphorus content in the precipitated alumina. In other words, if the phosphorus content of the solution exceeds a value of about 2 grams $P_2O_5$ per liter, the resulting alumina will also contain too much phosphorus for the standard adopted above. In carrying out the present procedure, a convenient measure of the minimum amount of calcium carbonate necessary to obtain the desired standard is the molar ratio between that material (i. e. calcium carbonate added as such) and the phosphorus in the bauxite (expressed as phosphorus pentoxide), e. g. the ratio $CaCO_3:P_2O_5$ for the given amount of bauxite that is to be treated in, say, any one digestion period.

It will now be seen that under the selected circumstances, optimum conditions can be readily determined. The molar ratio required depends upon the time of digestion and upon the quantity of calcium hydroxide which is added to the digester charge for formation of fresh sodium hydroxide in the liquor. By way of illustration of the manner in which the ratio depends on such factors, there are set forth hereinbelow some particular conditions and ratios that may be taken to represent specific examples of my process, it being understood that when carrying out the present method in actual production, the fundamental aspects of the Bayer process (e. g. caustic and alkali concentrations, temperatures, method of alumina precipitation, and manner of recycling) may be such as constitute known and accepted practice in the art.

Based correspondingly on actual tests employing such practice, the above mentioned examples of minimum values now preferred for the invention are as follows. If the time of digestion is 10 minutes, and if no calcium hydroxide is added to the digester charge, the molar ratio $CaCO_3:P_2O_5$ should be at least 8:1. If the time of digestion is 10 minutes and calcium hydroxide is used in the proportion of 3 parts per 100 parts of bauxite by weight the molar ratio of $CaCO_3:P_2O_5$ should be at least 2:1, but when the time of digestion is increased to 60 minutes, this ratio need only be 1.8:1, and for intermediate digestion times the ratio may be between these limits.

It will be seen that in a general sense, the greater the quantity of calcium hydroxide, the smaller is the amount of calcium carbonate required, and to a corresponding but lesser degree, the effect of increase of digestion time is also apparently such as to reduce the requirement of calcium carbonate. Ordinarily the minimum digestion time will be that needed for desired utilization of the Bayer process under the given circumstances, disregarding the problem of phosphorus contamination; in some cases the time preferred for the ordinary digestion procedure, without my present invention, may be as much as 30 minutes or more. To the extent that this time can be increased economically (with regard to other considerations of commercial operation), some saving of calcium carbonate may be effected.

As indicated above, the precise chemical or physical mechanism whereby calcium carbonate impedes the solution of phosphorus in the liquor is not understood, but tests have abundantly established the efficacy of the process, i. e. in that despite a high phosphorus content in the bauxite, the equilibrium value to which the phosphorus concentration in the solution rises can now be kept at or well below a tolerable minimum. Although the exact form of the calcium carbonate does not seem significant in other respects, great convenience is served by having it in a fine state of subdivision, i. e. in order that it may act with practical rapidity. It is essentially insoluble in the aluminate solution, and in practice can be filtered off with the residue from digestion after serving its purpose. Then in repeating the process, calcium carbonate is added anew, e. g. in a fresh quantity, for each cycle. According to present experience there is no harm, either to the recovery of alumina or the rejection of phosphorus, in using even a considerable excess of calcium carbonate over the requirements suggested above, but in most cases reasons of economy make it important to avoid a substantial excess.

Generally speaking, the chief criterion for the use of my process, and indeed, in the last analysis, for the amount of calcium carbonate to be employed in it, is the phosphorus content of the bauxite, which ordinarily determines the value to which the phosphorus concentration of the liquor may rise in the course of recycling and in the absence of added calcium carbonate—i. e. the ultimate equilibrium value. In turn, as stated above, the equilibrium value governs the phosphorus contamination of the precipitated alumina. If significant contamination is to be avoided, under ordinary circumstances a value of 2 grams $P_2O_5$ per liter seems an inherently appropriate maximum for the phosphorus in the liquor. Thus where I refer below to a specific phosphorus content of the bauxite as a limit upon the practical use of calcium hydroxide (alone) to prevent undue concentrations in the liquor, it will be understood that an undue concentration means one exceeding the above-selected value of 2 grams $P_2O_5$ per liter.

It will also be appreciated that wherever reference is made herein to calcium hydroxide as added to the digest liquor, such term is used generically (unless the contrary is stated) to include calcium oxide as an alternative, in the manner already mentioned. In naming a specific proportion of phosphorus in the bauxite, the figure given below represents phosphorus pentoxide, rather than phosphorus per se, although of course the phosphorus can, for purposes of calculation, be measured as if in either of these forms or any other form that may be specified. In point of fact the phosphorus occurs only in chemical combination in both the bauxite and the aluminate solution; but present inability to make a precise identification of the actual phosphorus compound or compounds in either body seems immaterial to this invention.

When the proportion of phosphorus (i. e. $P_2O_5$) in the bauxite does not exceed 0.6% by weight, undue concentrations in the digest liquor will, even when this is used repeatedly, be prevented by the presence of the amount of calcium hydroxide used to replace the sodium hydroxide consumed, but when this percentage is exceeded further amounts of calcium must be added. According to my invention, this additional calcium is added as calcium carbonate.

I claim:

1. In a process of separating alumina values from bauxite by digestion with caustic liquor, wherein the bauxite contains more than 0.6% by weight of phosphorus pentoxide which is capable of contaminating the liquor, the method of impeding solution of phosphorus in said liquor which comprises introducing calcium carbonate as such into the liquor and effecting said digestion in the presence of said calcium carbonate.

2. In the Bayer process for recovery of alumina values from bauxite by digestion with a liquor containing sodium hydroxide and sodium carbonate in a predetermined proportion, said bauxite containing more than 0.6% by weight of phosphorus pentoxide, the method of impeding contamination of the liquor with phosphorus, which comprises introducing calcium carbonate as such into the liquor without thereby changing the aforesaid proportion, and maintaining the presence of said calcium carbonate during the digestion.

3. In a cyclic process of separating alumina values from bauxite by successive digestions with liquor containing sodium hydroxide, wherein the bauxite contains more than 0.6% by weight of phosphorus pentoxide which is capable of contaminating the liquor, the method of impeding solution of phosphorus in the liquor which comprises introducing quantities of calcium carbonate as such into the liquor from time to time so that calcium carbonate is present in the liquor during the digestion following each such introduction.

4. In a cyclic process of separating alumina values from phosphorus-containing bauxite by digesting successive quantities of the latter with a correspondingly recycled liquor containing sodium hydroxide and sodium carbonate, wherein the alumina content of the liquor is reduced intermediate successive digestions and the proportion of said hydroxide and carbonate is brought to a predetermined value for each digestion, said bauxite containing more than 0.6% by weight of phosphorus pentoxide, the method of preventing the phosphorus content of the liquor from exceeding a predetermined, low value which comprises introducing calcium carbonate as such into the liquor from time to time and suppressing solution of phosphorus from the bauxite by maintaining such calcium carbonate in the liquor during each digestion.

5. In the cyclic process of producing sodium aluminate by the digestion with sodium hydroxide of bauxite which contains more than 0.6% by weight of phosphorus pentoxide, the maintenance of the proportion of phosphorus pentoxide in the liquor of digestion at a level not higher than 2 grams per liter by the introduction into the digester charge from time to time of calcium carbonate as such, in addition to the introduction from time to time of combined calcium that is selected from the class consisting of calcium oxide and calcium hydroxide and that is required to replace losses of sodium hydroxide.

6. The process as described in claim 5 in which calcium hydroxide is added to the digester charge in quantities sufficient to replace losses of sodium hydroxide, and the quantity of calcium carbonate added is such that between the calcium carbonate and the phosphorus pentoxide content of the bauxite a molar ratio is maintained which is selected from the range, relative to the time of digestion, that extends from at least 2:1 for a digestion time of 10 minutes to at least 1.8:1 for a digestion time of 60 minutes.

7. In the cyclic process of producing sodium aluminate by the digestion of bauxite containing more than 0.6% of phosphorus pentoxide by weight with sodium hydroxide but without calcium except in the form of calcium carbonate, the maintenance of the proportion of phosphorus dissolved in the liquor of digestion at a level not higher than 2 grams per liter by the introduction from time to time into the digester charge of calcium carbonate as such and in a quantity such that the molar ratio between the calcium carbonate and the phosphorus pentoxide content of the bauxite is at least 8:1.

WILLIAM ADDISON JAMES.

REFERENCES CITED

The following references are of record in the file of this patent:

UNITED STATES PATENTS

| Number | Name | Date |
|---|---|---|
| 663,167 | Hall | Dec. 4, 1900 |
| 938,432 | Peffer | Oct. 26, 1909 |
| 1,137,860 | Howard | May 4, 1915 |
| 1,918,735 | Gradley et al. | July 18, 1933 |